(12) United States Patent
Bradley

(10) Patent No.: US 7,384,076 B2
(45) Date of Patent: Jun. 10, 2008

(54) PIPE RING APPARATUS AND METHOD

(75) Inventor: Earl Terence Bradley, Eastland, TX (US)

(73) Assignee: EBAA Iron, Inc., Eastland, TX (US)

( * ) Notice: Subject to any disclaimer, the term of this patent is extended or adjusted under 35 U.S.C. 154(b) by 201 days.

(21) Appl. No.: 10/971,407

(22) Filed: Oct. 22, 2004

(65) Prior Publication Data

US 2006/0087121 A1   Apr. 27, 2006

(51) Int. Cl.
*F16L 17/00* (2006.01)
*F16L 19/00* (2006.01)
*F16L 21/02* (2006.01)

(52) U.S. Cl. ............... 285/373; 285/104; 285/329; 285/379

(58) Field of Classification Search ............ 285/104, 285/105, 232, 329, 379, 373
See application file for complete search history.

(56) References Cited

U.S. PATENT DOCUMENTS

| | | | | |
|---|---|---|---|---|
| 2,779,610 A * | 1/1957 | Risley | ................. | 285/323 |
| 3,252,192 A | 5/1966 | Smith | | |
| 3,594,023 A | 7/1971 | Yano | | |
| 4,805,932 A * | 2/1989 | Imhof et al. | .............. | 285/4 |
| 5,118,139 A * | 6/1992 | Lott | ................ | 285/15 |
| 5,190,324 A | 3/1993 | Bird et al. | | |
| 5,197,768 A * | 3/1993 | Conner | ................ | 285/105 |
| 5,209,524 A | 5/1993 | Corwon et al. | | |
| 5,464,228 A * | 11/1995 | Weber et al. | ............. | 277/615 |
| 5,772,253 A * | 6/1998 | Hodge et al. | ............. | 285/15 |
| 5,911,446 A * | 6/1999 | McLennan et al. | ........ | 285/104 |
| 6,106,029 A * | 8/2000 | DeMore et al. | ........... | 285/322 |
| 6,131,957 A * | 10/2000 | Saito et al. | .......... | 285/133.21 |
| 6,302,450 B1 | 10/2001 | Dole et al. | | |
| 6,305,719 B1 * | 10/2001 | Smith et al. | ............. | 285/15 |
| 6,364,367 B1 | 4/2002 | Hintzen | | |
| 6,517,122 B1 * | 2/2003 | Minemyer | .............. | 285/328 |
| 6,565,125 B2 * | 5/2003 | Robison, Jr. | ............. | 285/104 |
| 6,945,570 B2 * | 9/2005 | Jones | ................. | 285/421 |
| 7,093,863 B2 * | 8/2006 | Holmes et al. | ........... | 285/337 |
| 2002/0033604 A1 * | 3/2002 | Minemyer | .............. | 285/373 |

* cited by examiner

*Primary Examiner*—James M. Hewitt
(74) *Attorney, Agent, or Firm*—Haynes and Boone, LLP

(57) ABSTRACT

An apparatus and method according to which the apparatus includes a pair of connected arcuate members for clamping around a pipe, with each arcuate member including at least one protrusion. The arcuate members have a first material hardness and at least a portion of the at least one protrusion has a second material hardness that is greater than the first material hardness so that the portion penetratingly engages the pipe when the arcuate members are clamped around the pipe.

10 Claims, 4 Drawing Sheets

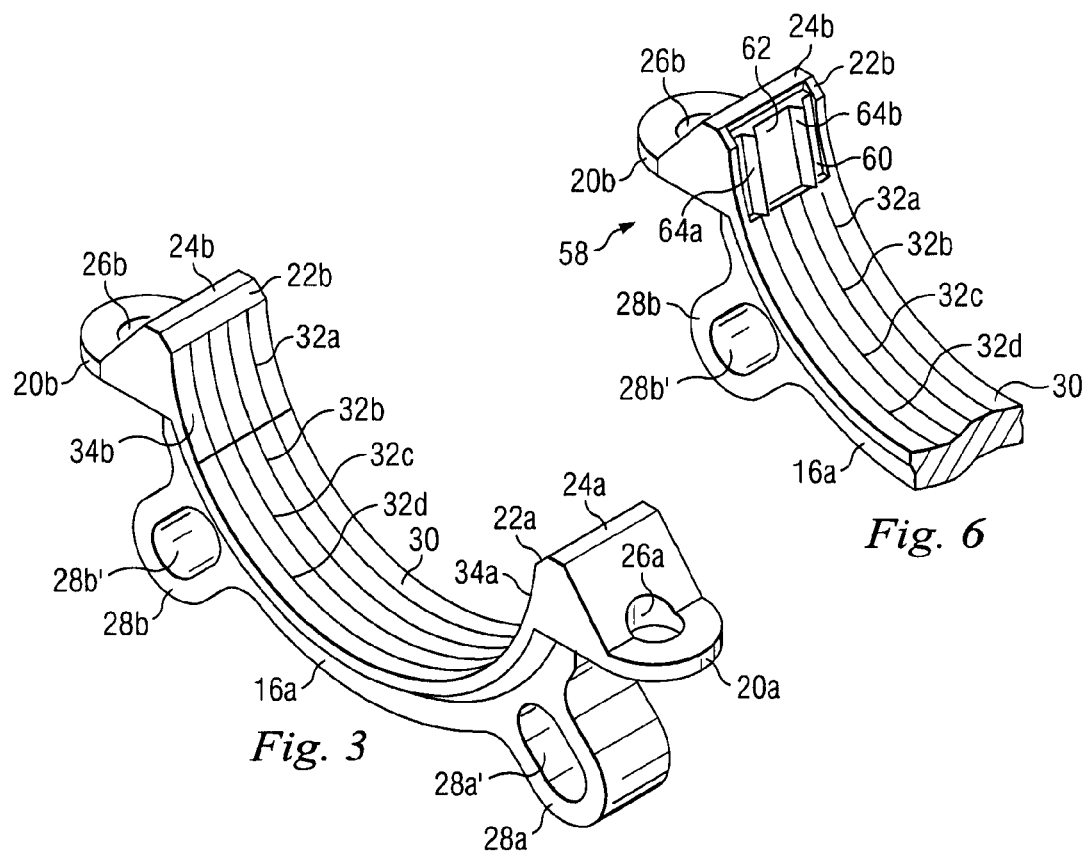
Fig. 3
Fig. 6
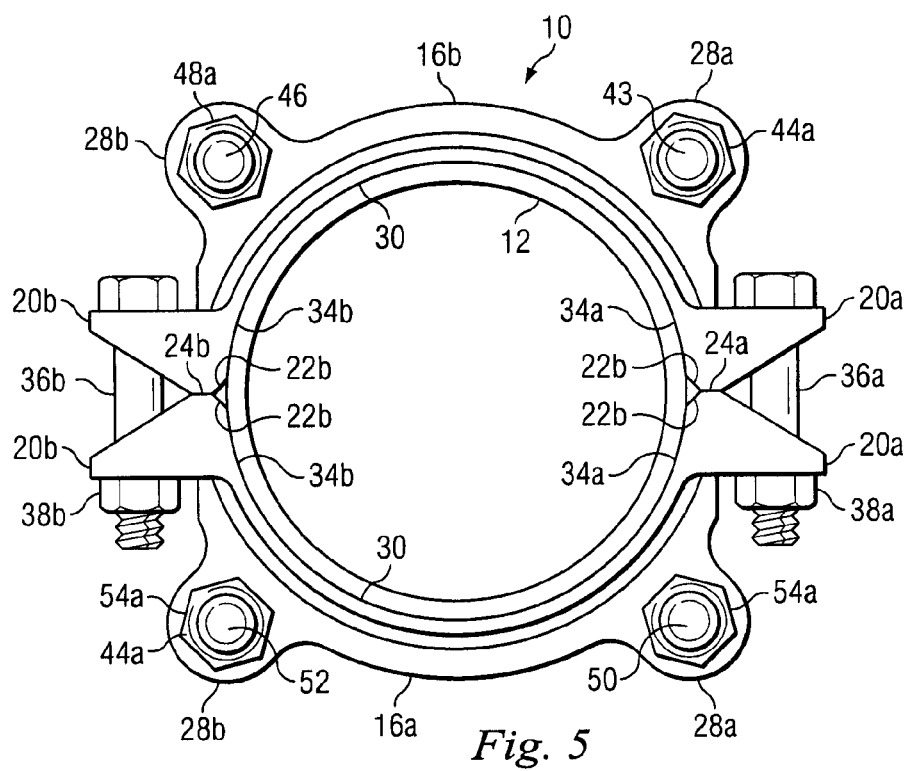
Fig. 5

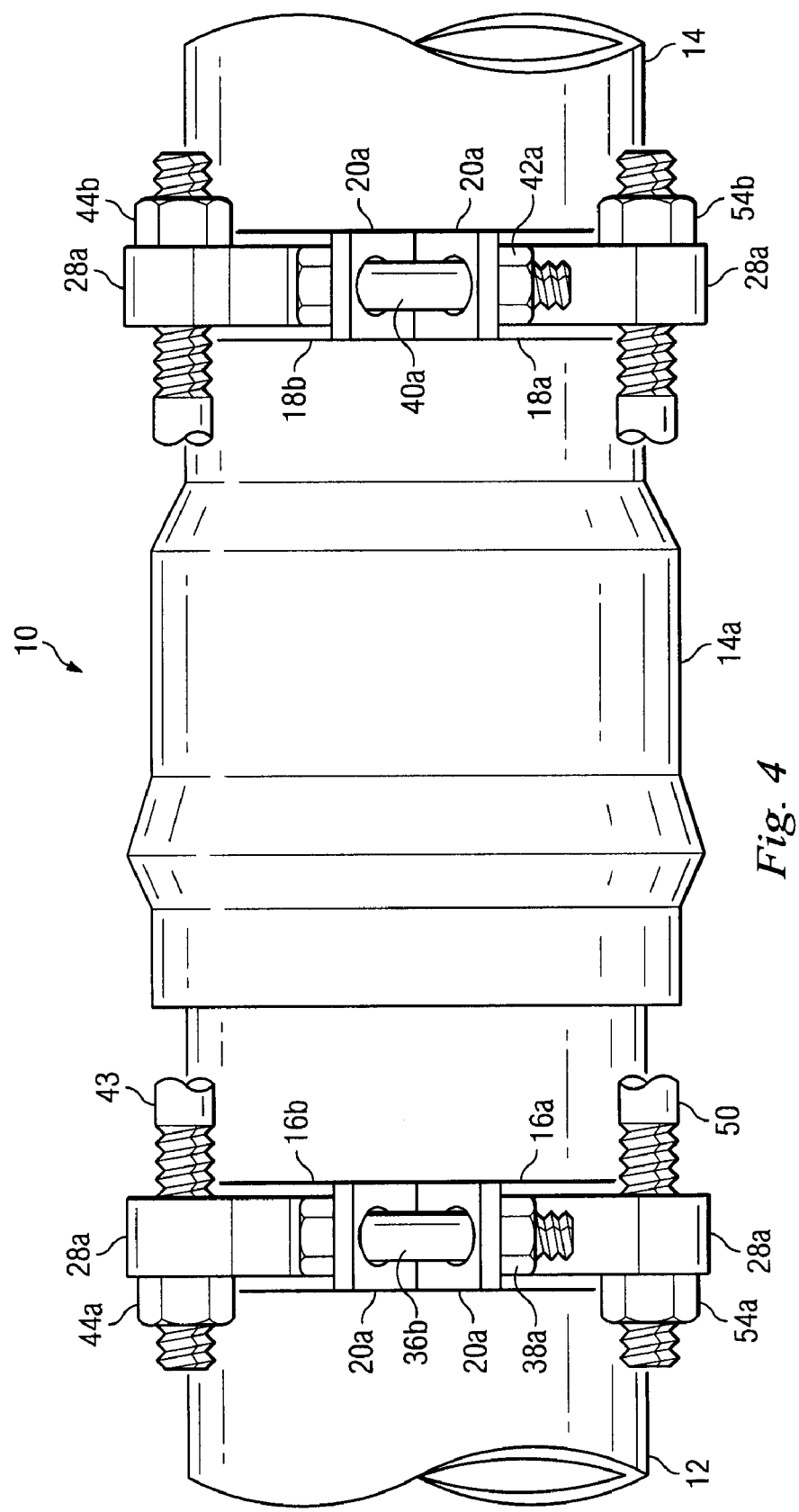

PIPE RING APPARATUS AND METHOD

BACKGROUND

The present invention relates in general to an apparatus for installation on a pipe and in particular to an apparatus employed in the restraint of connected pipes to prevent the separation thereof.

A conventional connection that joins two adjacent pipes in a fluid-transporting pipeline system is sometimes subjected to internal hydrostatic pressure and/or other external and/or internal forces that tend to deflect or separate one pipe from the other. To combat this separation, a pipe-restraining assembly may be installed across the connection between the two pipes to penetratingly engage and maintain the pipes in a fixed position relative to each other.

However, a typical pipe-restraining assembly may not be suitable for all types of pipe materials. That is, the ability of the pipe-restraining assembly to penetratingly engage and restrain a pipe is dependent upon the pipe surface having a material hardness that is relatively low. Thus, the pipe-restraining assembly may not be able to prevent the axial separation of pipes having relatively high material hardness levels.

Therefore, what is needed is an apparatus for installation on a pipe and an accompanying method that, among other things, may be used to overcome the above-described problem.

BRIEF DESCRIPTION OF THE DRAWINGS

FIG. 3 is a detailed perspective view of a portion of the pipe-restraining assembly shown in FIG. 2.

FIG. 4 is an elevation view of the pipe-restraining assembly of FIG. 1.

FIG. 5 is another elevation view of the pipe-restraining assembly of FIG. 1.

FIG. 6 is a partial perspective/partial section view of a component of a pipe-restraining assembly according to an embodiment of the present invention.

DETAILED DESCRIPTION

Figure 1:
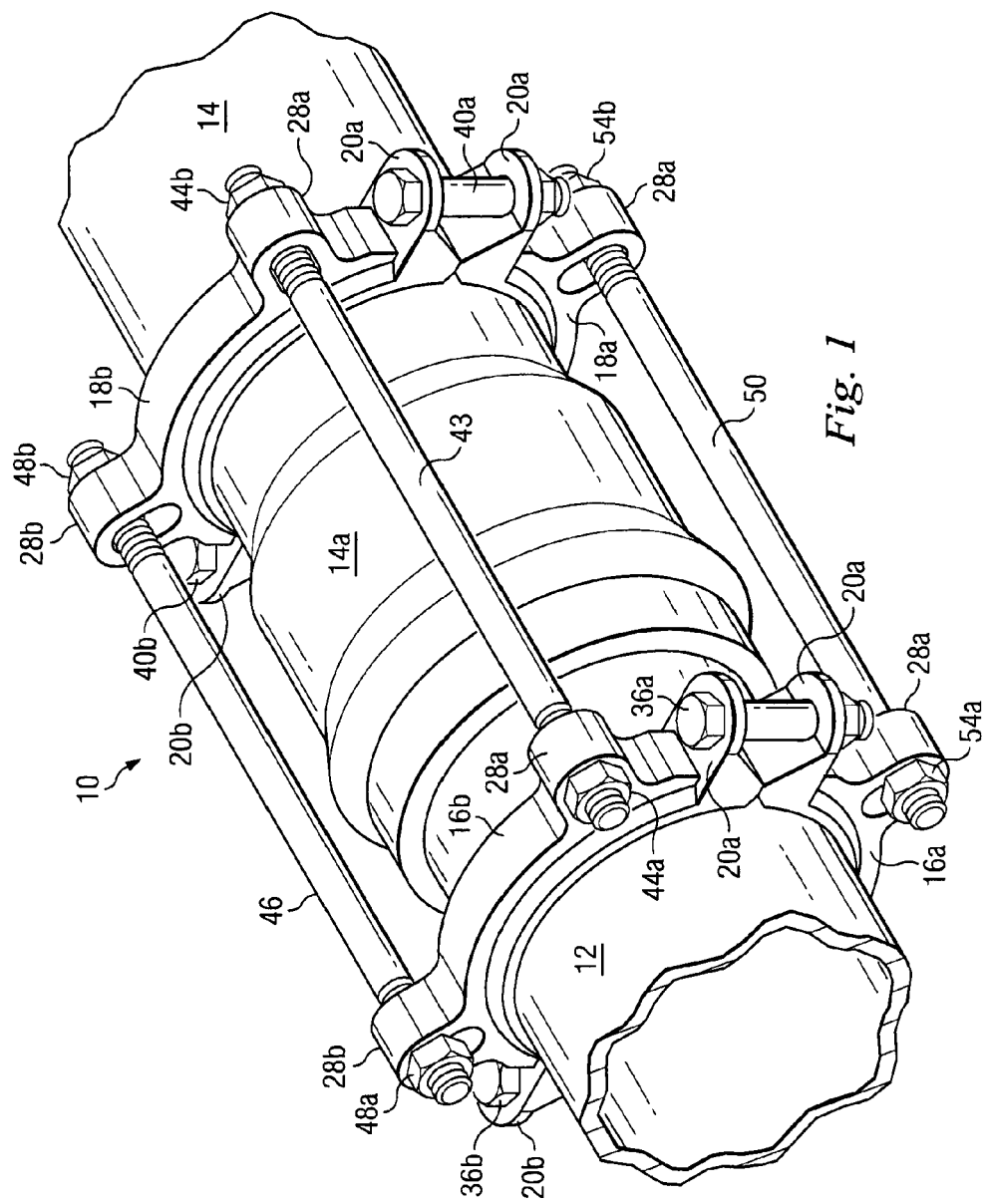
FIG. 1 is a perspective view of a pipe-restraining assembly according to an embodiment of the present invention and clamped around connected pipes.
Figure 2:
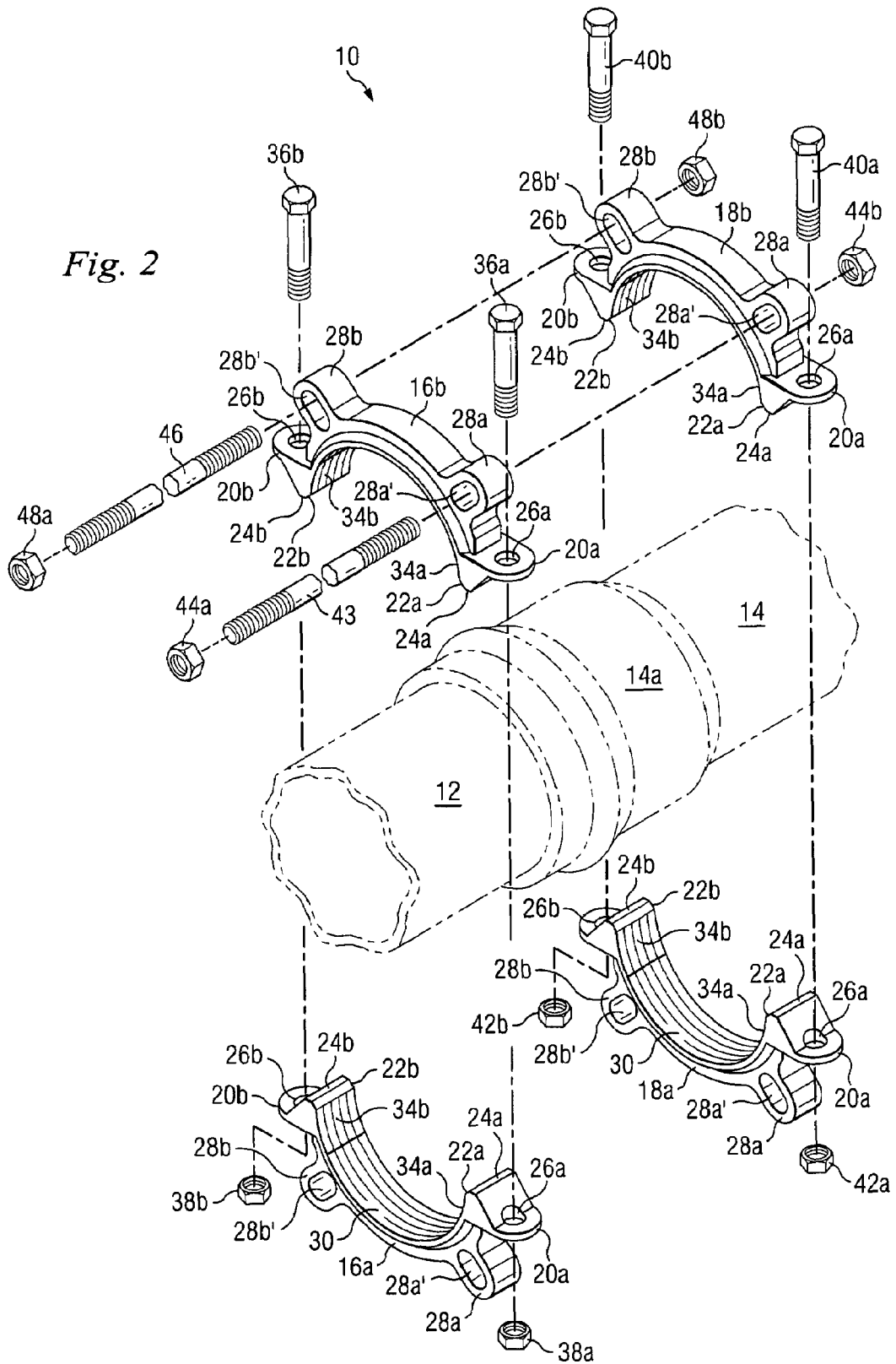
FIG. 2 is an exploded view of the pipe-restraining assembly of FIG. 1.

Referring to FIGS. 1-2, a pipe-restraining assembly according to an embodiment of the present invention is generally referred to by the reference numeral 10 and is designed to be installed on connected pipes 12 and 14. The pipe 14 includes a bell 14a which receives a conventional spigot extending from the pipe 12 (spigot not shown). The pipes 12 and 14 are sealingly engaged in any conventional manner, and may be made of any conventional pipe material such as, for example, polyvinylchloride (PVC) or ductile iron.

The assembly 10 includes two spaced pairs of arcuate members 16a and 16b, and 18a and 18b. Each pair of arcuate members 16a and 16b, and 18a and 18b, forms a ring that envelops portions of and clamps around the pipes 12 and 14, respectively.

As more clearly shown in FIG. 3, with continuing reference to FIGS. 1-2, opposing flange members or ears 20a and 20b extend outward from each end of the arcuate member 16a. Each ear 20a and 20b includes a chamfer 22a and 22b and a horizontal surface 24a and 24b, respectively. Openings or bores 26a and 26b are formed through the ears 20a and 20b, respectively. Lugs 28a and 28b extend from the arcuate member 16a and are positioned so that the spacing between the ear 20a and the lug 28a, and the spacing between the ear 20b and the lug 28b, are equal along the curved length of the arcuate member. Each lug 28a and 28b defines a through-opening or bore 28a' and 28b', respectively.

The arcuate member 16a defines a curved surface 30, with the opposing ends of the curved surface 30 terminating at the chamfers 22a and 22b. A plurality of protrusions or ridges 32a, 32b, 32c and 32d extend radially inward from the curved surface 30 so that the distal ends of the ridges 32a-32d are radially offset from the curved surface 30. The ridges 32a-32d also extend along the length of the curved surface 30. The curved surface 30, and the ridges 32a-32d, include opposing portions 34a and 34b which are substantially defined by and substantially extend from the ears 20a and 20b, and to the lugs 28a and 28b, respectively. At least some of the material in each of the portions 34a and 34b has a material hardness that is higher than the remainder of the arcuate member 16a, including the remainder of the curved surface 30 and the ridges 32a-32d. It is understood that the portions 34a and 34b may be caused to have a material hardness that is higher than the remainder of the arcuate member 16a by performing a material-hardening process of such portion such as, for example, a conventional heat treating process.

The arcuate members 16b, 18a and 18b are identical to the arcuate member 16a and thus will not be described in detail. Parts of the arcuate members 16b, 18a and 18b corresponding to identical parts of the arcuate member 16a are given the same reference numerals.

Referring to FIGS. 4-5, with continuing reference to FIGS. 1-3, bolts 36a and 36b extend through the vertically-aligned bores 26a and 26b of each arcuate member 16a and 16b. Nuts 38a and 38b are threadably engaged with the bolts 36a and 36b, respectively, and contact the ears 20a and 20b, respectively, thereby connecting the arcuate members 16a and 16b and clamping the members around the pipe 12. The surface 24a of each arcuate member 16a and 16b contacts the corresponding surface 24a of the other arcuate member, and the surface 24b of each arcuate member contacts the corresponding surface 24b of the other arcuate member. The ridges 32a-32d of each arcuate member 16a and 16b penetratingly engage the pipe 12.

Likewise, bolts 40a and 40b extend through the vertically-aligned bores 26a and 26b of the arcuate members 18a and 18b, respectively, and are threadably engaged with nuts 42a and 42b, respectively. These threaded engagements connect the arcuate members 18a and 18b and clamp the members around the pipe 14. The surface 24a of each arcuate member 18a and 18b almost contacts or contacts the corresponding surface 24a of the other arcuate member, and the surface 24b of each arcuate member almost contacts or contacts the corresponding surface 24b of the other arcuate member. The ridges 32a-32d of each arcuate member 18a and 18b penetratingly engage the pipe 14.

A tie rod 43 extends through each aligned bore 28a' of the arcuate members 16b and 18b so that the tie rod is in a parallel relation with the coaxial longitudinal axes of the pipes 12 and 14. Nuts 44a and 44b are threadably engaged with the distal and proximal ends of the tie rod 43, respectively, thereby connecting the arcuate members 16a and 16b with the arcuate members 18a and 18b. In an identical manner, a tie rod 46 extends through each aligned bore 28b' of the arcuate members 16b and 18b, and nuts 48a and 48b are threadably engaged with the distal and proximal ends of the tie rod, respectively. Similarly, tie rods 50 and 52 extend through each aligned bore 28a' and 28b', respectively, of the arcuate members 16a and 18a (tie rod 52 shown in FIG. 5). Nuts 54a and 54b are threadably engaged with the distal and proximal ends of the tied rod 50, respectively, and nuts 56a and 56b are threadably engaged with the distal and proximal ends of the tied rod 52, respectively (nut 56b not shown).

In operation, with continuing reference to FIGS. 1-5, the pipes 12 and 14 form a fluid-transporting pipeline so that the pipes are subject to internal hydrostatic pressure. This internal pressure, along with any external forces present due to system-level or environmental conditions, results in forces being applied to the connection between the spigot of the pipe 12 and the bell 14a of the pipe 14 which, in turn, urge the pipes 12 and 14 to axially separate or pull apart from each other.

However, pipe-restraining assembly 10 restrains or prevents the pipe 12 from appreciably moving axially relative to, or separating from, the pipe 14, and vice versa. The penetrating engagement of the ridges 32a-32d of the arcuate members 16a and 16b into the pipe 12 prevents the arcuate members from moving axially relative to the pipe 12. Likewise, the penetrating engagement of the ridges 32a-32d of the arcuate members 18a and 18b into the pipe 14 prevents the arcuate members from moving axially relative to the pipe 14. Further, the clamping forces generated by the threaded engagements of the tie rods 43, 46, 50 and 52 with the nuts 44a and 44b, 48a and 48b, 54a and 54b, and 56a and 56b, respectively, and applied to the corresponding lugs 28a and 28b, prevents the arcuate members 16a and 16b from moving axially relative to the arcuate members 18a and 18b, and vice versa. Since the arcuate members 16a and 16b, and 18a and 18b, are prevented from moving relative to the pipes 12 and 14, respectively, and from moving relative to each other, the pipes 12 and 14 are therefore prevented from appreciably moving relative to and/or axially separating from one another.

The sections of the ridges 32a-32d located in the portions 34a and 34b of the arcuate members 16a and 16b penetratingly engage the pipe 12 to a greater degree than the sections of the ridges 32a-32d that are located outside of the portions 34a and 34b. The aforementioned heat treatment of the portions 34a and 34b and the corresponding increase in hardness promotes the increased penetration of the ridges 32a-32d into the pipe 12 at the portions. Also, the inwardly-directed radial forces exerted on the pipe 12 by the arcuate members 16a and 16b are relatively higher at the portions 34a and 34b due to the portions' proximity to the clamping forces generated by the threaded engagement of the bolts 36a and 36b with the nuts 38a and 38b, respectively, and applied to the ears 20a and 20b, respectively, thereby further promoting the increased penetration of the ridges 32a-32d into the pipe at the portions.

In a like manner, the sections of the ridges 32a-32d located in the portions 34a and 34b of the arcuate members 18a and 18b penetratingly engage the pipe 14 to a greater degree than the sections of the ridges 32a-32d that are located outside of the portions 34a and 34b. Thus, the increased penetration of the ridges 32a-32d at the portions 34a and 34b further prevents the arcuate members 16a and 16b, and 18a and 18b, from moving relative to the pipes 12 and 14, respectively, thereby further inhibiting any axial separation of the pipes.

Referring to FIG. 6, another embodiment of a pipe-restraining assembly is generally referred to by the reference numeral 58. The embodiment shown in FIG. 6 is similar to the embodiment shown in FIGS. 1-5 and contains several parts of the embodiment which are given the same reference numerals. In the embodiment of FIG. 6, a recess 60 is formed in the curved surface 30 and the surface defined by the chamfer 22b so that the recess is adjacent the horizontal surface 24b. A plate or insert 62 is disposed in the recess 60 and connected to the arcuate member 16a. A pair of protrusions or ridges 64a and 64b extend radially inward from the insert 62 so that the distal ends of the ridges 64a and 64b are radially offset from the curved surface 30. The ridges 64a and 64b also extend along the length of the insert 62, thereby substantially extending along a section of the length of the curved surface 30. The arcuate member 16a has a substantially uniform material hardness. The insert 62 and the ridges 64a and 64b have a material hardness that is higher than the material hardness of the arcuate member 16a.

In a like manner, inserts identical to the insert 62 are disposed in recesses formed in the opposing end of the arcuate member 16a, and in the opposing ends of the arcuate members 16b, 18a and 18b. It is understood that, with the exception of the foregoing, the pipe-restraining assembly 58 is identical to the pipe-restraining assembly 10 and therefore will not be further described.

The operation of the embodiment of FIG. 6 is similar to that of FIGS. 1-5, except that the ridges 64a and 64b extending from the insert 62, and the ridges extending from the other inserts connected to the arcuate members 16a, 16b, 18a and 18b, penetratingly engage the pipes 12 and 14 to a greater degree than the ridges 32a-32d extending from the curved surfaces 30 of the arcuate members.

VARIATIONS

It is understood that variations may be made in the foregoing without departing from the scope of the disclosure. For example, only one pair of arcuate members 16a and 16b, or 18a and 18b, may include the ridges 32a-32d.

Further, instead of connecting the pair of arcuate members 16a and 16b to another pair of identical arcuate members such as the arcuate members 18a and 18b, the pair of arcuate members 16a and 16b could be connected to the restrained sleeve pipe coupling and/or one or more of the corresponding end rings disclosed in co-pending patent application Ser. No. 10/170,477, published on Dec. 18, 2003 as U.S. patent application publication no. 2003/0230897 A1, the disclosure of which is incorporated by reference.

Still further, the pair of arcuate members 16a and 16b could be employed in conjunction with a conventional flanged connection between a pipe having a flange and a pipe having a plain end. The arcuate members 16a and 16b could be clamped together around the pipe having the plain end in a manner described above, and the tie rods 43, 46, 50 and 52 could extend from the arcuate members 16a and 16b and through bores formed in the flange. The nuts 44b, 48b, 54b and 56b could then be threadably engaged with the tie rods 43, 46, 50 and 52, respectively, to apply clamping forces to the flange and promote a flanged connection that is more resistive to any forces tending to separate the pipes. It is understood that the flanged connection may be between straight pipe sections, curved pipe sections, etc. or any combination thereof.

In view of the foregoing, it is understood that the pair of arcuate members 16a and 16b, or 18a and 18b, may be clamped around any pipe in any type of application where it is desired to form a ring around the pipe and maintain the as-installed position of the arcuate members relative to the pipe, notwithstanding the subsequent subjection of the installed arcuate members, or ring, to various static and/or dynamic loads in various directions.

Additional variations include the following:
1. The quantity and spacing of the lugs 28a and 28b and any corresponding tie rods may be varied.
2. The pipes 12 and 14 may be made of other material such as, for example, high-density polyethylene. It is understood that the pipes 12 and 14 may be made of many different types of materials having widely varying material hardness levels.
3. In addition to the employment of ears, bolts and nuts, the arcuate members 16a and 16b, and 18a and 18b, may be connected using other conventional fastening means such as, for example, with clamps.
4. The number of ridges extending from the curved surface 30 and the insert 62 may be varied. Further, the size, shape, location, spacing and cross-sectional profile of the ridges 32a-32d and 64a-64b may be varied. For example, the ridges 32a-32d and 64a-64b may have rectangular, triangular or arcuate cross-sections, or any combination thereof.
5. For the embodiment of FIGS. 1-5, the locations and size of the portions 34a and 34b may be varied, and the quantity of the portions may be varied. For the embodiment of FIG. 6, the quantity, locations and size of the inserts 62 may be varied.
6. In addition to the above-described spigot-and-bell and flanged connections, the pipe-restraining assembly 10 and/or 58 and/or any variation thereof may be used with other types of pipe connections.
7. The cross-sectional profiles and the locations of the arcuate members 16a, 16b, 18a and 18b relative to the connection between the pipes 12 and 14 may be varied.
8. In addition to tie rods, other fastening means may be employed to connect the pair of arcuate members 16a and 16b to the pair of arcuate members 18a and 18b such as, for example, cables and turnbuckles, bolts, etc. or any combination thereof.
9. The lengths of the tie rods 43, 46, 50 and 52 and the bolts 36a, 36b, 40a and 40b may be varied.
10. For the embodiment of FIG. 6, different portions of the arcuate members 16a, 16b, 18a and 18b may have different material hardness levels, instead of the arcuate members having a substantially uniform hardness level.
11. For the embodiments of FIGS. 1-5 and FIG. 6, different portions of the curved surfaces 30, and the balance of the arcuate members 16a, 16b, 18a and 18b, may have differing material hardness levels. For example, there may be three or more material hardness levels in a single arcuate member in either embodiment.
12. The pipe-restraining assemblies 10 and 58 may be combined so that one pair of arcuate members employs the inserts 62 while the other pair of arcuate members does not.
13. Additional pairs of arcuate members may be clamped around the same or additional pipes. These additional pairs may be connected to the arcuate members 16a and 16b and/or 18a and 18b.
14. The arcuate members 16a and 16b may be modified so that the surfaces 24a and 24b of each arcuate member 16a and 16b do not contact the corresponding surfaces 24a and 24b, respectively, of the other arcuate member. The arcuate members 18a and 18b may also be modified in this manner.
15. Any foregoing spatial references, such as "upper," "lower," "above," "below," "between," "vertical," "angular," etc., are for the purpose of illustration only and do not limit the specific orientation or location of the structure described above.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

What is claimed is:

1. An assembly comprising:
    a first pair of connected arcuate members for clamping around a first pipe, each arcuate member comprising:
        a curved surface, and
        at least one protrusion substantially extending radially inward and including a distal end that is radially spaced from the curved surface, the at least one protrusion substantially extending at least partially along the length of the curved surface; and
    means for connecting the first pair of arcuate members to a second pipe, said second pipe being connected to the first pipe whereby separation of the first pipe from the second pipe is restrained;
    wherein the arcuate members have a first material hardness and at least a portion of the at least one protrusion has a second material hardness, wherein the second material hardness is greater than the first material hardness so that the portion of the at least one protrusion penetratingly engages the first pipe when the arcuate members are clamped around the first pipe;
    wherein the connecting means comprises a second pair of arcuate members for clamping around the second pipe;
    wherein each arcuate member in the second pair comprises:
        a curved surface, and
        at least one protrusion substantially extending radially inward and including a distal end that is radially spaced from the curved surface, the at least one protrusion substantially extending at least partially along the length of the curved surface; and
    wherein the arcuate members in the second pair have the first material hardness and at least a portion of the at least one protrusion has the second material hardness so that the portion of the at least one protrusion penetratingly engages the second pipe when the second pair of arcuate members are clamped around the second pipe.

2. The assembly of claim 1 wherein the at least one protrusion of each arcuate member in the first pair substantially extends radially inward from the corresponding curved surface and substantially extends along the entire length of the corresponding curved surface.

3. The assembly of claim 1 wherein each arcuate member in the first pair further comprises:
    a first recess formed in the curved surface; and
    a first plate disposed in the first recess;
    wherein the at least one protrusion substantially extends radially inward from the first plate.

4. The assembly of claim 3 wherein the curved surface of each arcuate member in the first pair comprises first and second opposing ends;
    wherein each arcuate member in the first pair further comprises:

a second recess formed in the curved surface, wherein the first and second recesses are adjacent the first and second opposing ends, respectively;
a second plate disposed in the second recess; and
at least one protrusion substantially extending radially inward from the second plate;
wherein at least a portion of the at least one protrusion extending from the second plate has the second material hardness so that the portion of the at least one protrusion extending from the second plate penetratingly engages the first pipe when the arcuate members are clamped around the first pipe.

5. Apparatus comprising:
a pair of removably connectable arcuate members for clamping around a pipe, each arcuate member comprising:
a curved surface, and
at least one protrusion substantially extending radially inward and including a distal end that is radially spaced from the curved surface, the at least one protrusion substantially extending at least partially along the length of the curved surface;
wherein the arcuate members have a first material hardness and at least a portion of the at least one protrusion has a second material hardness, wherein the second material hardness is greater than the first material hardness;
wherein the curved surface includes first and second opposing ends;
wherein each arcuate member further comprises:
a first recess formed in the curved surface;
a first plate disposed in the first recess, wherein the at least one protrusion substantially extends radially inward from the first plate;
a second recess formed in the curved surface, wherein the first and second recesses are adjacent the first and second opposing ends, respectively;
a second plate disposed in the second recess; and
at least one protrusion substantially extending radially inward from the second plate;
wherein at least a portion of the at least one protrusion extending from the second plate has the second material hardness;
wherein each arcuate member further comprises at least one ridge extending radially inward from the curved surface and along the length of the section of the curved surface located between the first and second recesses;
wherein the at least one ridge extending from the curved surface and along the length of the section of the curved surface located between the first and second recesses has the first material hardness;
wherein each of the at least one protrusion extending from the first plate and the at least one protrusion extending from the second plate penetratingly engages the pipe when the arcuate members are clamped around the pipe;
wherein the at least one ridge extending from the curved surface and along the length of the section of the curved surface located between the first and second recesses penetratingly engages the pipe when the arcuate members are clamped around the pipe; and
wherein, when the arcuate members are clamped around the pipe, each of the at least one protrusion extending from the first plate and the at least one protrusion extending from the second plate penetratingly engages the pipe to a greater degree than the at least one ridge extending from the curved surface and along the length of the section of the curved surface located between the first and second recesses.

6. A method comprising:
providing a pair of arcuate members, each arcuate member having a first material hardness and defining a curved surface from which at least one protrusion extends;
processing the arcuate members so that at least a portion of each at least one protrusion has a second material hardness, wherein the second material hardness is greater than the first material hardness; and
clamping the pair of arcuate members around a first pipe so that each portion of each at least one protrusion having the second material hardness penetratingly engages the first pipe and so that respective portions of the arcuate members, which are generally circumferentially aligned with respective ones of the at least one protrusions and which have the first material hardness, penetratingly engage the first pipe;
wherein each portion of each at least one protrusion having the second material hardness penetratingly engages the first pipe to a greater degree than the respective portions of the arcuate members having the first material hardness.

7. The method of claim 6 further comprising connecting at least one plate to each arcuate member, each plate comprising a respective one of the at least one protrusions.

8. The method of claim 6 further comprising connecting the pair of arcuate members to a second pipe connected to the first pipe to restrain the first pipe from separating from the second pipe.

9. A method comprising:
providing a pair of arcuate members, each arcuate member having a first material hardness and comprising a first protrusion;
connecting at least one plate to each arcuate member, wherein a second protrusion extends from each of the plates, each of the second protrusions having a second material hardness that is greater than the first material hardness;
clamping the pair of arcuate members around a first pipe;
penetratingly engaging the first pipe with the first protrusions; and
penetratingly engaging the first pipe with the second protrusions;
wherein the second protrusions penetratingly engage the first pipe to a greater degree than the first protrusions.

10. The method of claim 9 further comprising connecting the pair of arcuate members to a second pipe connected to the first pipe to restrain the first pipe from separating from the second pipe.

* * * * *